Nov. 14, 1950            G. H. ROBINSON            2,529,663
PUSHER DOG CONVEYER ASSEMBLY
Filed June 6, 1946
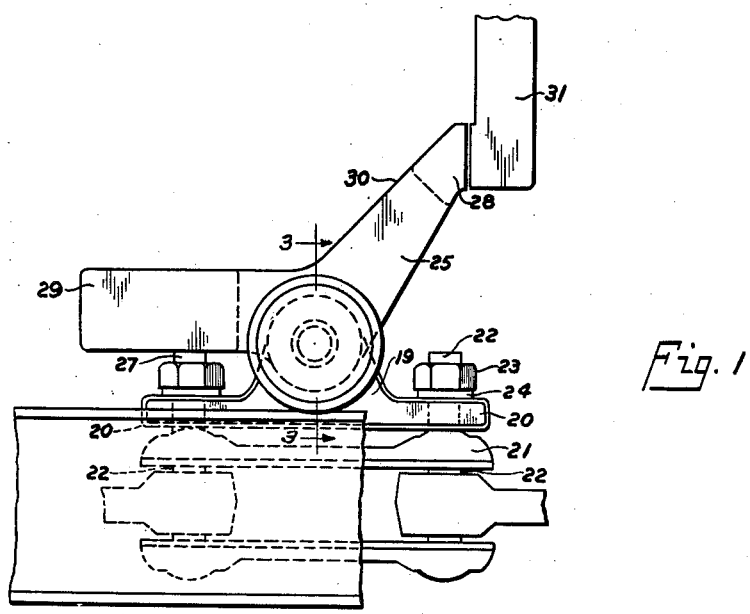
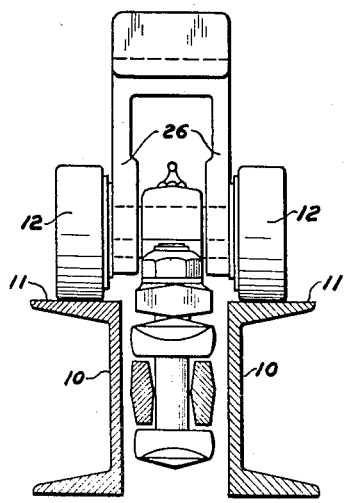
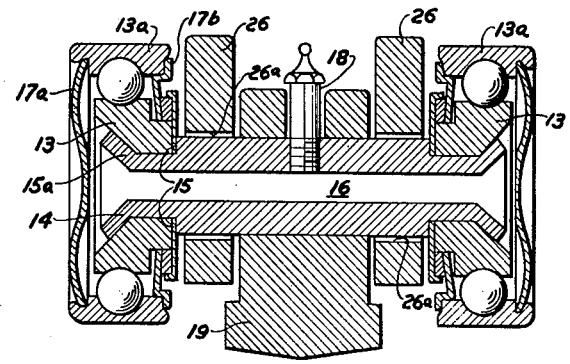
INVENTOR.
GEORGE H. ROBINSON
BY Joseph Farley
ATTORNEY.

Patented Nov. 14, 1950

2,529,663

UNITED STATES PATENT OFFICE 2,529,663

PUSHER DOG CONVEYER ASSEMBLY

George H. Robinson, Royal Oak, Mich., assignor to Jervis B. Webb Company, Detroit, Mich., a corporation of Michigan Application June 6, 1946, Serial No. 674,827

2 Claims. (Cl. 198—170)

This invention relates to power driven conveyor systems and more particularly to a means for moving independently supported loads along a conveyor line.

In automotive and other assembly lines continuous power means are frequently used for moving loads along the floor or other structural surface within a plant. One means which has found a great number of applications is to provide a continuously moving power chain at or near the floor surface of the plant with means for connecting such power chain to loads which are to be moved along such assembly lines.

It is the principal object of the present invention to provide an improved anti-friction means for suspending a power chain of this type.

Another object of the invention is to provide an improved means for connecting the power chain to loads which are to be pushed thereby.

A further object of the invention is to provide a pusher dog construction which will permit a load to be moved past such pusher dog in a forward direction but which will otherwise provide positive driving engagement.

Another object of the invention is to adapt the locking pins of a "keystone" type chain to mount a driving dog assembly which is in turn adapted to run along a conveyor track furnishing support for such power chain.

A further object of the invention is to provide the power chain with protection against accidental or intentional damage such as frequently results from the introduction of foreign objects within the links of the power chain which interfere with its passing over the sprockets provided to change the direction and impart motion to such chain.

Another object of the invention is to provide improved lubricating means for the wheels provided to run along the conveyor track.

A further object of the invention is to provide an extremely simple and economical construction for accomplishing the above objects.

These and other objects will appear more clearly from the following detailed description of a particular embodiment of the invention and from an examination of the drawings forming a part hereof and wherein, Fig. 1 is a side elevation of a driving dog assembly, a section of the power chain which is connected thereto, and a cutaway section of the conveyor track.

Fig. 2 is an end elevation of the driving dog assembly and power chain shown in Fig. 1 including a sectional view of the conveyor track.

Fig. 3 is a sectional view taken along the line 3—3 of Fig. 1.

As shown in Fig. 2, the conveyor track comprises two opposed ordinary structural steel channel members 10, the upper surfaces 11 of which provide a track for wheels 12 to run along. As most clearly shown in Fig. 3, the wheels 12 are of a ball bearing type, the inner races 13 of which are nonrotatably secured upon a fixed tubular axle 14. The axle 14 is provided with shoulders 15 and swedged ends 15a for holding the wheels in position and has a hollow center 16 communicating at its ends with the interior of the wheel ball bearings thereby providing a lubricant passage and reservoir for such wheels. Retainer plates 17a and 17b preferably of sheet metal are secured to the outer races or rims 13a of the wheels 12 and serve to hold the lubricant within the wheels and prevent the entry of dirt or foreign matter to the moving parts and bearings of such wheel. A lubricating fitting 18 extends upwardly from the center of the axle 14 for supplying grease or other suitable lubricant to the hollow center 16 thereof and such fitting is protected against accidental damage by surrounding members to be hereinafter described.

A bracket member 19 is centrally and nonrotatably mounted on the axle 14 and is provided with two longitudinally extending legs 20. The overall length of the bracket member 19 with its legs 20 is substantially equal to the length of the side bar 21 of the power chain which is attached to such bracket by means of special locking pins 22. These pins extend upwardly through an aperture in each end 20 of the bracket member 19 and are held in position by means of nuts 23 and lock washers 24.

The axle 14 also serves as a journal for the pusher dog 25 which is connected thereto by yoke members 26 provided with cylindrical apertures 26a having a diameter somewhat in excess of outer diameter of the axle 14 thereby permitting free articulation of the pusher dog about such axle. The upper surface 27 of the rearward locking pin 22 serves as a stop to limit the backward rotation of the locking dog 25 about the axle 14. The upwardly extending driving end 28 of the arm of pusher dog 25 is normally held in driving position by the weight of the tailpiece arm 29 of said dog but is free to move downward upon being contacted at its rear surface 30 by the engaging member 31 of a load being pushed ahead of the driving dog, thereby permitting such load to pass in a forward direction. After such engaging member of a load has passed the driving dog 25, the weight of the tailpiece arm 29 returns the dog to driving position whereupon it will engage and push or propel the engaging member 31 of any load in its path.

The channel members 10 may be placed on top of a floor surface or in a recess provided for them in the floor and serve to protect the links of the driving chain from the introduction of foreign objects or other damage. The anti-friction roller bearing wheels 12 serve to support the driving chain in a manner which permits it to be driven with a minimum of frictional resistance while also serving to hold the driving dog in a positive vertical position relative to the upper surface 11 of the conveyor track member 10.

The construction of the pusher dog assembly described above is particularly advantageous for use in conveyor lines such as final assembly lines in an automobile plant where certain operations in the line may be performed more rapidly than others and as a result of which it may be desirable, upon completing a certain operation, to move the automobile by hand to a more forward position along the power line.

Since each of the driving dogs in the power line will yield to the engaging member of any load approaching it from the rear, loads may be moved to any forward position desired, thus providing a degree of flexibility in the spacing of the loads along the line not available where a rigid type of dog construction is used. The engaging member of the load may be any means connected to such load and extending down beneath the top surface of the driving dog 25.

Thus, it is seen that with a very simple and economical construction, each of the objects of this invention has been satisfied. While a particular embodiment of the present invention has been described in detail above, it will be recognized that a number of modifications are possible without departing from the spirit of the invention as reflected in the following claims.

I claim:

1. In a conveyor line along which independently supported loads are to be moved, a driving means comprising a power driven chain of the type having center links, side bars and removable locking pins, a chain track having transversely spaced members between which said chain is suspended, the top surface of said track members providing a running surface for wheels on either side of said chain, special locking pins for connecting the chain links, brackets mounted to said chain by means of said special locking pins, wheels rotatably mounted on said brackets for running along the top surface of said track, and means for transferring drive from said power chain to said loads.

2. In a conveyor line along which independently supported loads are to be moved, a driving means comprising a power driven chain of the type having center links, side bars and removable locking pins, a chain track having transversely spaced members between which said chain is suspended, the top surface of said track members providing a running surface for wheels on either side of said chain, special locking pins for mounting bracket members as well as for connecting the chain links, bracket members mounted with said locking pins on top of said chain, axles mounted on said bracket members, wheels rotatably mounted on said axles for running along the top surface of said track, pusher dogs articulately mounted on said axles, said pusher dogs having normally upwardly extending members for drivingly engaging said loads and tailpieces whose weight urges said members to their upward driving position, the upper surface of said locking pins serving as a stop for limiting the articulation of said pusher dogs in a manner whereby the engaging member of said loads may be moved past said pusher dogs in a forward direction but will otherwise be drivingly engaged automatically by said pusher dogs.

GEORGE H. ROBINSON.

REFERENCES CITED

The following references are of record in the file of this patent:

UNITED STATES PATENTS

| Number | Name | Date |
| --- | --- | --- |
| 870,003 | Willson | Nov. 5, 1907 |
| 2,133,391 | Lemmon | Oct. 18, 1938 |

FOREIGN PATENTS

| Number | Country | Date |
| --- | --- | --- |
| 86,121 | Germany | July 9, 1895 |
| 113,959 | Germany | Oct. 4, 1900 |